March 9, 1965 H. A. MULLIN ETAL 3,172,566
GREASE TANK TRAILER
Filed April 6, 1962 9 Sheets-Sheet 1

INVENTORS
HUGH A. MULLIN
WILLIAM H. TOMLINSON
BY
Alfred R. Fuchs
ATTORNEY

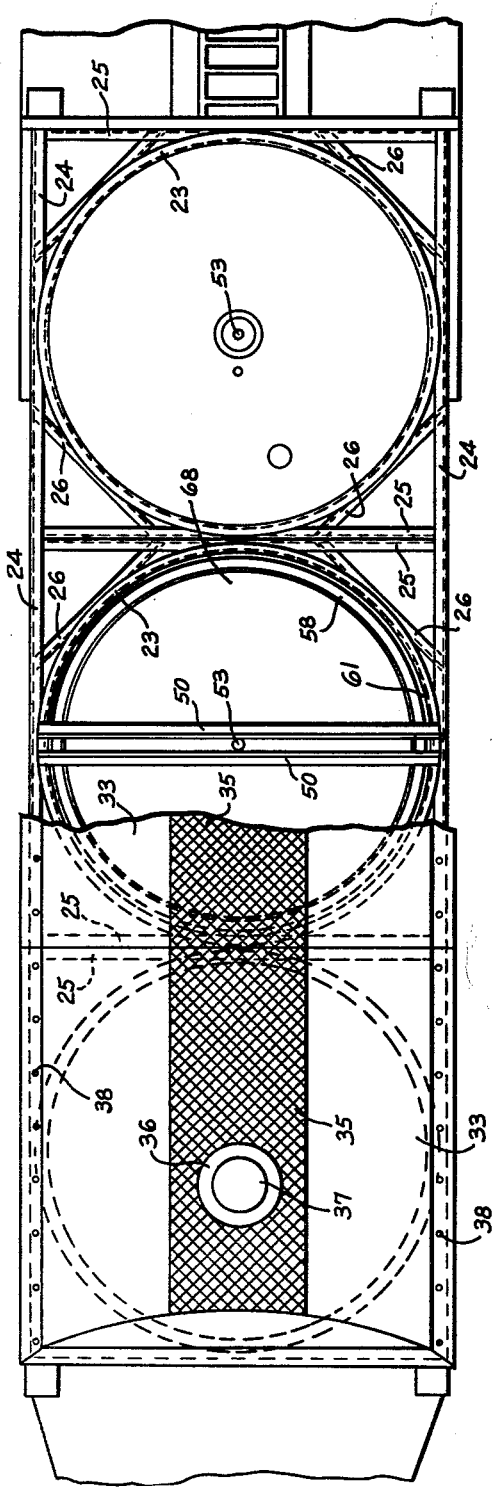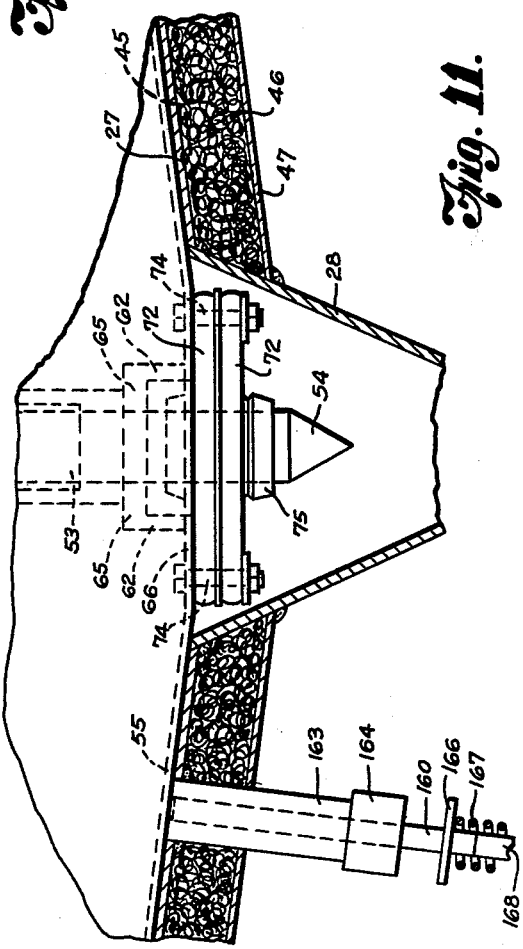

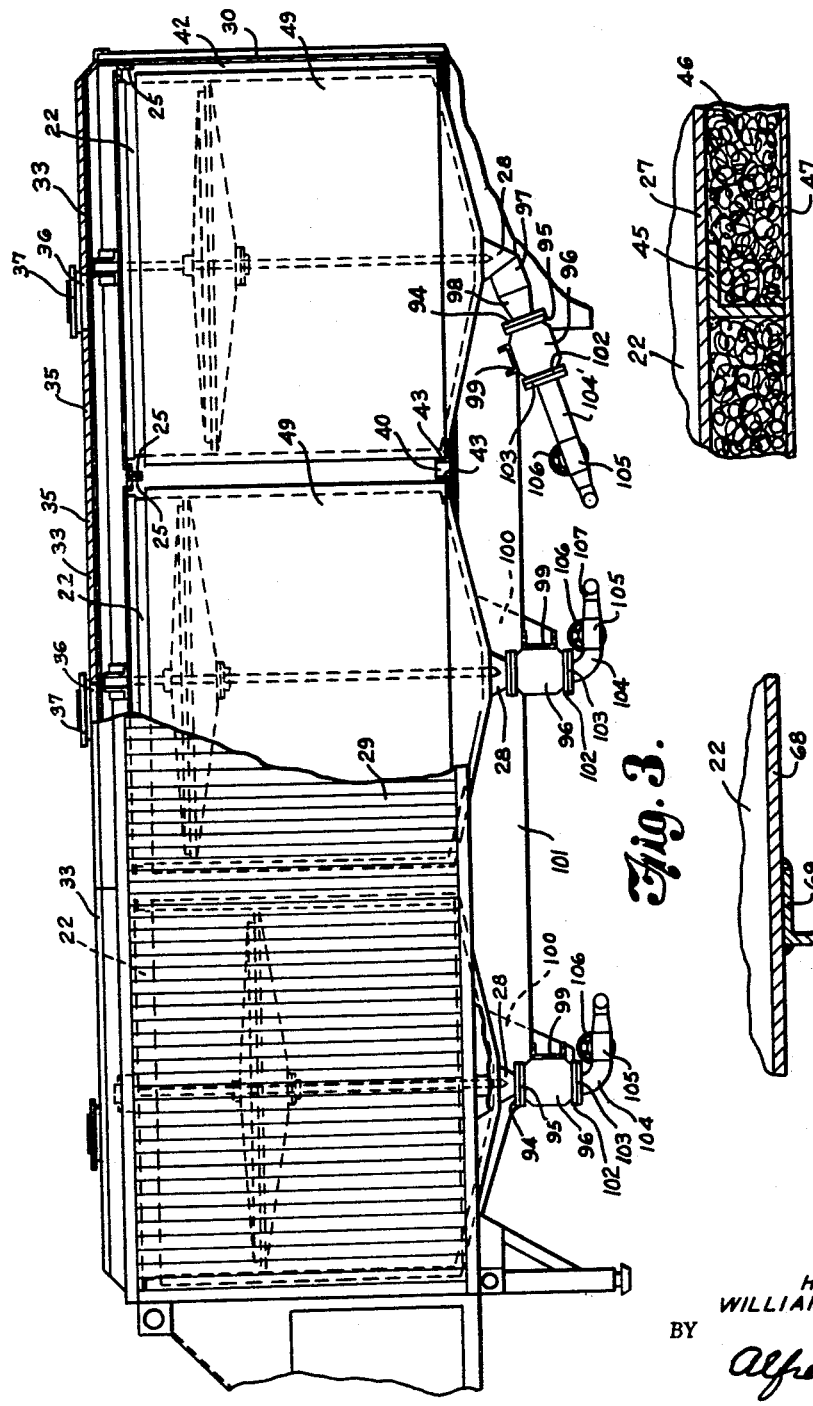

INVENTORS
HUGH A. MULLIN
WILLIAM H. TOMLINSON
BY
Alfred R. Fuchs
ATTORNEY

March 9, 1965  H. A. MULLIN ETAL  3,172,566
GREASE TANK TRAILER
Filed April 6, 1962  9 Sheets-Sheet 6
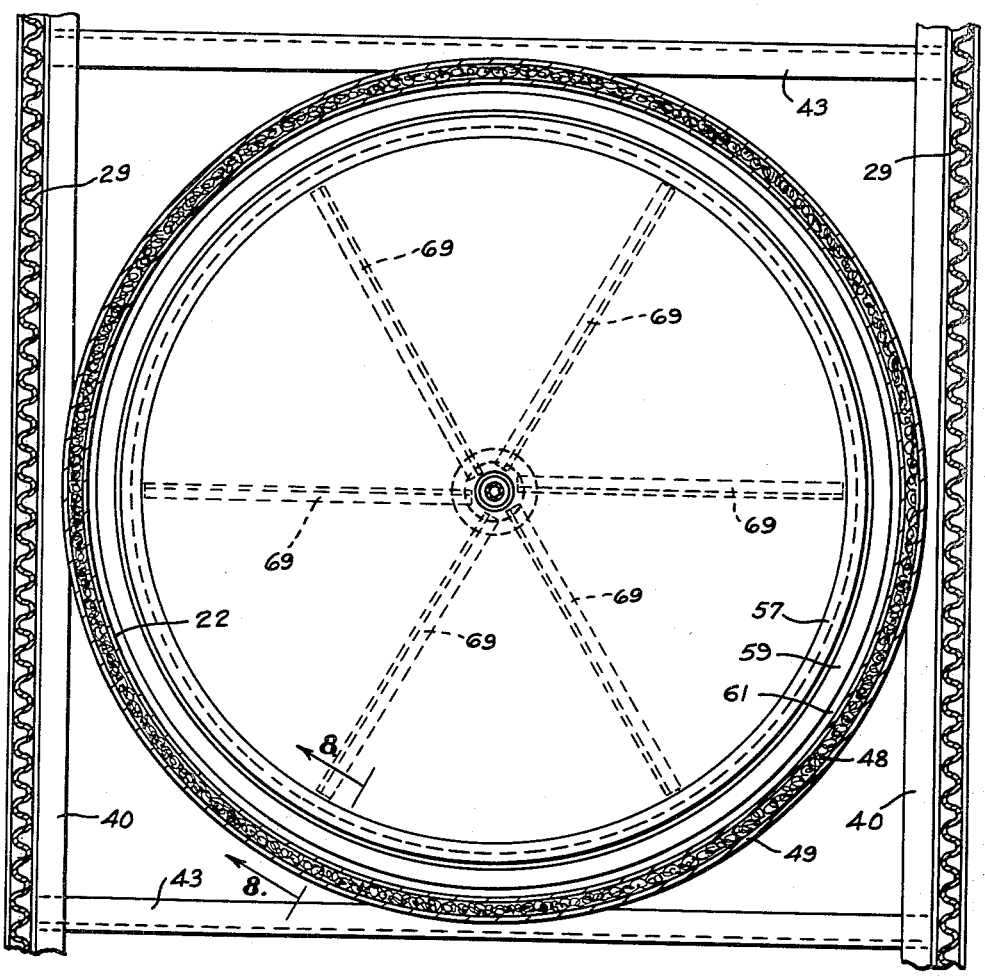
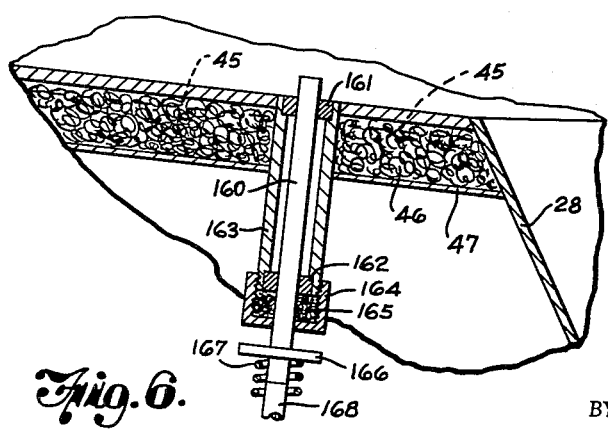
*Fig. 7.*
*Fig. 6.*
INVENTORS
HUGH A. MULLIN
WILLIAM H. TOMLINSON
BY
*Alfred R. Fuchs*
ATTORNEY INVENTORS
HUGH A. MULLIN
WILLIAM H. TOMLINSON
BY
Alfred R. Fuchs
ATTORNEY INVENTORS
HUGH A. MULLIN
WILLIAM H. TOMLINSON
BY Alfred R. Fuchs
ATTORNEY

United States Patent Office 3,172,566
Patented Mar. 9, 1965

3,172,566
GREASE TANK TRAILER
Hugh A. Mullin and William H. Tomlinson, Kansas City, Mo., assignors, by mesne assignments, to Columbian Steel Tank Company, Kansas City, Mo., a corporation of Delaware
Filed Apr. 6, 1962, Ser. No. 185,761
14 Claims. (Cl. 222—39)

Our invention relates to vehicles, and more particularly to grease tank vehicles.

The transportation of grease in large quantities in bulk is frequently desired for the industrial use of grease, the transportation being from the plant producing the grease to the industry using it. Grease is compounded in different formulas, dependent upon the use thereof, and it is desirable to provide means for transporting the grease in bulk in such a manner that grease compounded in accordance with different formulas can be simultaneously transported by the vehicle and kept from intermingling in a manner such that contamination of one type of grease by another is avoided.

In order to avoid such contamination of one quantity of grease by another that is being transported at the same time or has been transported previously in the same tank vehicle, it is a purpose of our invention to provide a bulk grease transport tank vehicle, such as a semi-trailer that is provided with a plurality of upstanding tanks that are so constructed and arranged, and which are provided with means for filling and emptying the same of such a character, that the contents of each tank will be completely isolated from the contents of the other tanks and so that any one of the tanks can be filled with one type of grease and that type removed therefrom and subsequently the same tank be filled with a different type of grease without any possibility of contamination of the succeeding filling of grease by the grease that had been previously in the same tank.

In order to carry out this purpose of the invention we provide a follower in each of the tanks, which fits the tank closely, and which is provided with wiping means for removing any grease that may be adhering to the walls of the tank as the follower moves downwardly during emptying the tank of grease, that has been transported therein.

Furthermore, in order to prevent contamination of a succeeding load of grease in a tank by a preceding load of grease that has been withdrawn therefrom, the follower and the tank bottom are so made that the follower will approach into such close adjacency to the bottom of the tank that the tank will be completely emptied of grease when the follower reaches its lowest position in the tank.

In order that the various greases can be kept from comingling, each of the tanks is provided with its own piping for feeding grease into the tank and for removing the grease from the tank, the grease removing means comprising a pump which is associated only with the piping provided for the particular tank with which it is used so that each tank is discharged through a pump that is only used for that particular tank.

As the grease will tend to solidify when it reaches atmospheric temperature, the grease is introduced into the tanks in a heated condition, and in order that the grease can be removed from the tanks without reheating the same, the tanks are heat insulated so as to maintain the grease in each thereof in a sufficiently liquid condition that it can be pumped from the tank in which it was placed. Due to the tendency of the grease to solidify in the piping connections and in the hoses used for discharging the contents of the tank, means is provided for cleaning the grease out of these pipe connections and hoses comprising means for introducing a ball-like clean-out slug into the piping and hose and providing a connection for air under pressure adjacent one end of the piping through which the cleaning slug can be introduced, whereby said cleaning slug is forced through the piping and hose to clean the grease out of the same.

More specifically it is a purpose of our invention to provide in a tank vehicle open topped tanks having upstanding side walls, followers mounted for up and down movement in said tanks, and guiding means for each of the followers, as well as wiping means on each follower engaging the guiding means and the side wall of the tank. The open topped tanks each preferably have a cylindrical side wall and the followers are circular in character. The guiding means for each follower preferably comprises a guide tube that is suspended from its upper end so as to have sufficient flexibility of movement that the follower will not bind between the guiding means and the side wall of the tank.

Still more specifically the follower preferably is provided with a conical bottom wall and a conical top wall curved oppositely to the conical bottom wall, and the tanks are each provided with a conical bottom wall of the same contour as the conical bottom wall of the follower mounted therein.

It is another purpose of our invention to provide a tank vehicle of the above referred to character with a pump for each tank connected through an outlet connection of said tank and means for selectively operating any one of the pumps to draw grease from a selected tank. Said outlet connection preferably comprises a pipe open at both ends into which a conduit leads between its ends, and which open ended pipe is provided with a removable closure member at one of its ends through which a clean-out slug can be inserted, and a valved compressed air connection leading into said pipe adjacent the open end that is provided with the removable closure member.

In order to provide a strong and light construction for the vehicle, the tank vehicle is provided with a framework that has longitudinal, cross and obliquely extending members that are located in such a position that a peripheral flange around the top of each of the tanks can be mounted on said longitudinal, cross and obliquely extending members so as to be suspended therefrom.

It is a further purpose of our invention to provide means for indicating the quantity of grease in each of the tanks as the filling operation is taking place, to provide means for stopping the operation of the pump associated with a tank when it has been completely emptied and an alarm for indicating that the capacity of the tank is being approached, which is for the purpose of indicating to the operator that he must closely watch the filling operation from that point on to prevent over filling of the tank.

It is a further purpose of our invention to provide a housing for said tank that is provided with a top wall that is made in sections, one section being provided over each tank, and the sections being removable independently of each other for access to the particular tank below one of said top wall sections, without the necessity of removing the other top wall section.

It is another purpose of our invention to provide means for venting each of the lines leading into the tank at the start of each loading operation and to provide a type of pump for discharging the contents of a tank, which will operate in reverse during the filling operation, the grease passing through the pump to rotate it in a reverse direction during such a filling operation.

Other objects and advantages of our invention will appear as the description of the drawings proceeds. We desire to have it understood, however, that we do not intend to limit ourselves to the particular details shown or described, except as defined in the claims.

In the drawings:

FIG. 2 is a top plan view of the tank trailer vehicle partly broken away, on a somewhat larger scale, taken from substantially the line 2—2 of FIG. 1.

FIG. 3 is a view partly in side elevation and partly in section, partly broken away, of our improved tank trailer vehicle.

FIG. 6 is a fragmentary detail sectional view, on a further enlarged scale, taken on the line 6—6 of FIG. 5.

FIG. 7 is a transverse horizontal section taken on the line 7—7 of FIG. 4.

FIG. 11 is a fragmentary view partly in vertical section of the bottom portion of one of the tanks at the discharge connection and showing the follower in dotted outline in a different position than that shown in FIG. 4.

FIG. 12 is a fragmentary detail sectional view taken on the line 12—12 of FIG. 8.

FIG. 13 is a fragmentary detail sectional view taken on the line 13—13 of FIG. 10.

Figure 4:
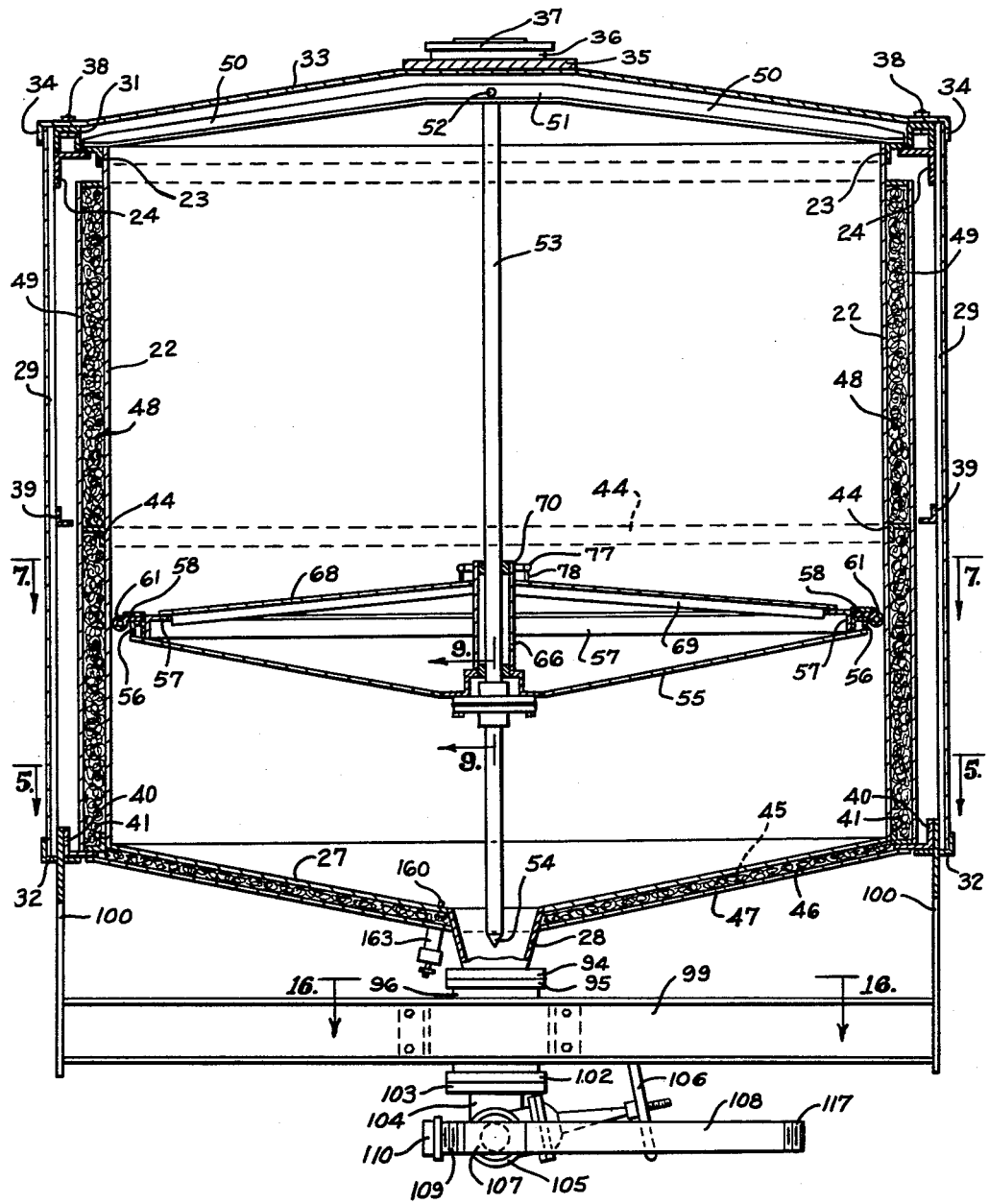
FIG. 4 is a vertical transverse sectional view thereof on a still larger scale.
Figure 17:
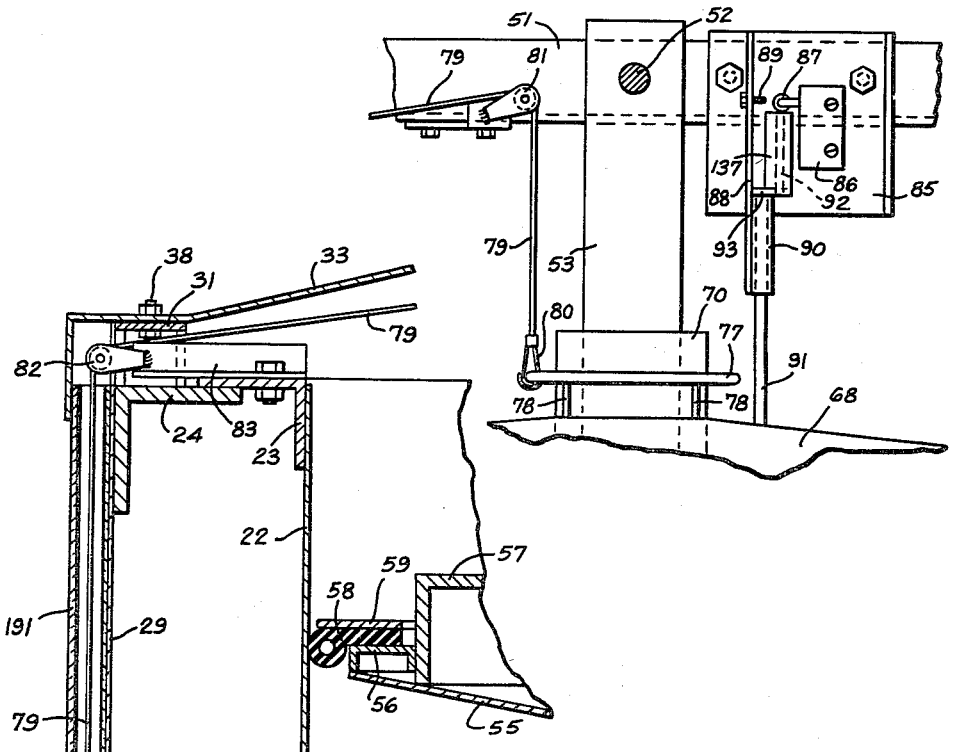
Figure 16:
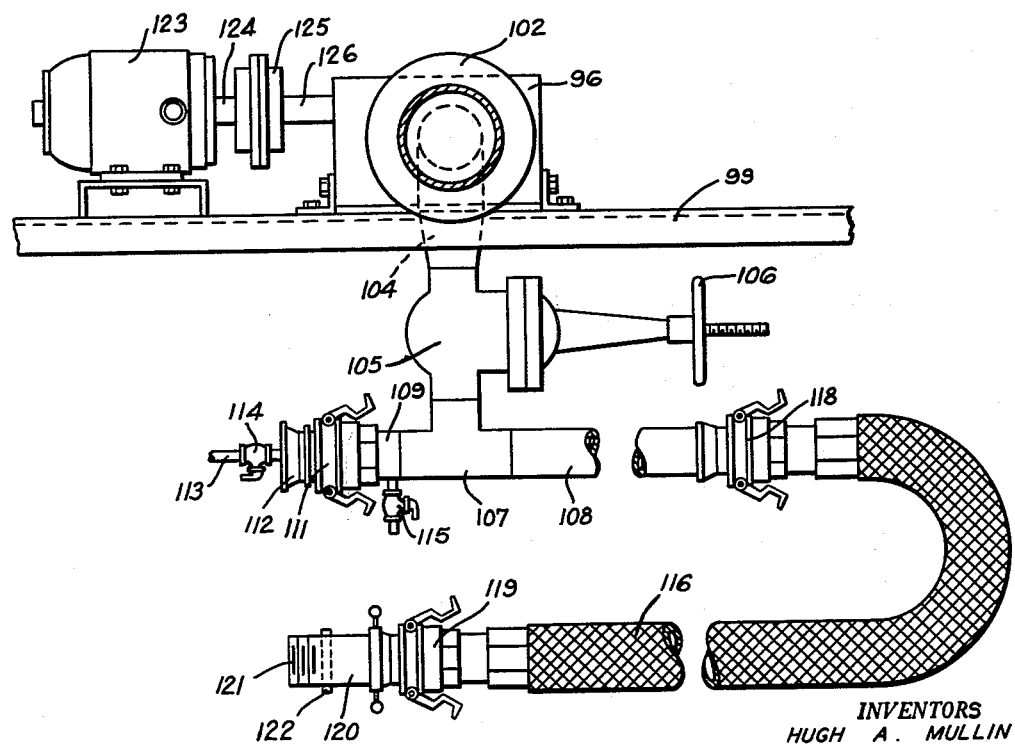

FIG. 16 is a fragmentary detail view partly in elevation and partly in section of the pump, valve and piping associated with one of the tanks, showing connections made therewith for cleaning out the pipe and hose associated therewith, said section being taken on the line 16—16 of FIG. 4, and FIG. 17 is a fragmentary view partly in section and partly in elevation, partly broken away, showing the means for operating the indicating means and alarm associated with each tank.

Figure 1:
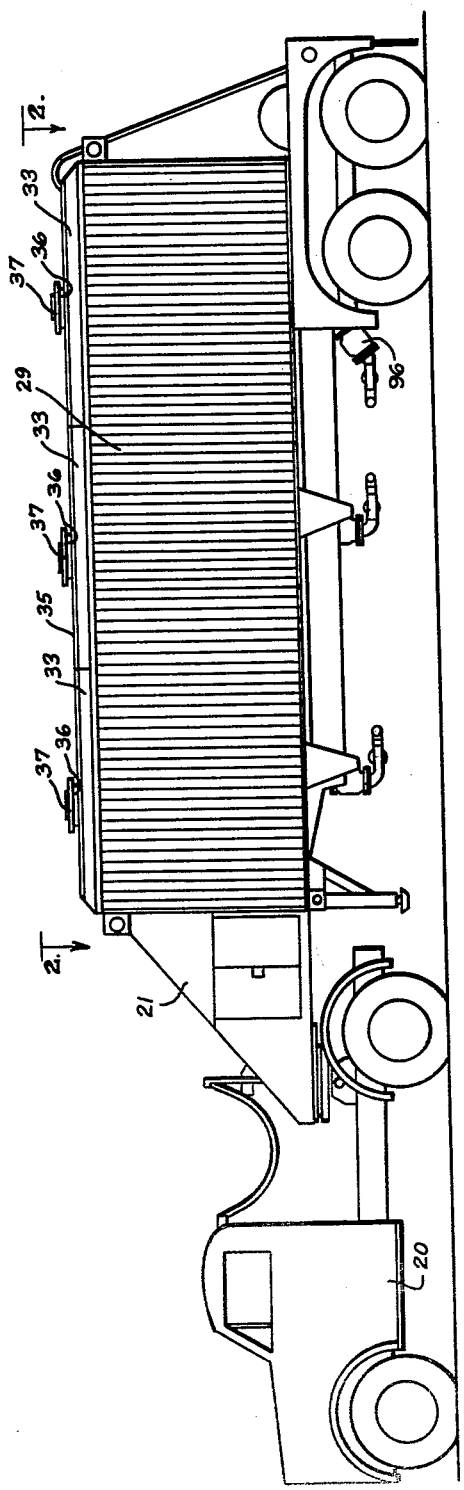
FIG. 1 is a view in side elevation of our improved grease tank trailer applied to a tractor or pulling vehicle.

Referring in detail to the drawings, in FIG. 1 is shown a tank vehicle that comprises a pulling vehicle or tractor 20 and a semi-trailer 21, which is provided with a plurality of tanks 22 that are arranged with their axes extending vertically as shown in FIG. 3. Said tanks are circular in horizontal section, as will be obvious, and the upper marginal edge portion of each of said tanks is provided with a reinforcing angle 23 extending around the same on the exterior thereof. The trailer vehicle is provided with a plurality of frame members located at the upper end portions of the tank 22, comprising longitudinally extending frame members 24, transversely extending frame members 25 and obliquely extending frame members 26, that are connected with the frame members 24 and 25 and extend as shown in FIG. 2. The top marginal flange provided by means of the angle member 23 at the top of each tank is mounted on the frame members 24, 25 and 26 in the manner illustrated for the frame member 24 in FIG. 4. The main body portion 22 of each tank is thus suspended at the marginal portion thereof from the framework.

Each of the tanks is provided with a conical bottom wall 27 and with a tapering sump 28 at the lowest point of said bottom wall, said sump 28 being secured in liquid tight relation to the bottom wall 27, as by welding. Said bottom wall 27 is also welded liquid tight to the vertical wall of the tank 22.

A housing is provided on the vehicle for the tanks, which comprises side wall members 29 and a rear end wall 30. Said side walls are provided with reinforcing channels 31 at the top thereof mounted on the frame members 24 and with reinforcing angles 32 at the bottom thereof. The housing is provided with a top wall that is made in sections, there being one top wall section 33 over each of the tanks 22, each of said top wall sections 33 being inclined upwardly from the depending marginal flanges 34 thereon to the longitudinal middle thereof. Mounted on each top wall section 33 is a walk-way section 35, and each of said top walls is provided with a manhole 36, which is provided with a detachable cover 37. The sections 33 of the top of the housing are removable, the same being fastened by means of bolts 38 to the channels 31. Said side walls 29 may be further reinforced, as by means of the longitudinally extending angles 39. Angles 40 are also provided to reinforce the structure longitudinally, being welded to the angles 32 and having angle rings 41 mounted thereon, said angle rings 41 extending around the bottom ends of the side walls of the tanks 22 and being secured thereto as by welding. The housing is also provided with vertical corner reinforcing angles 42 and transverse frame members 43 extend between the longitudinal angles 40, and also mount the angle rings 41. Each of the tanks is also provided with a reinforcing ring 44.

Figure 5:
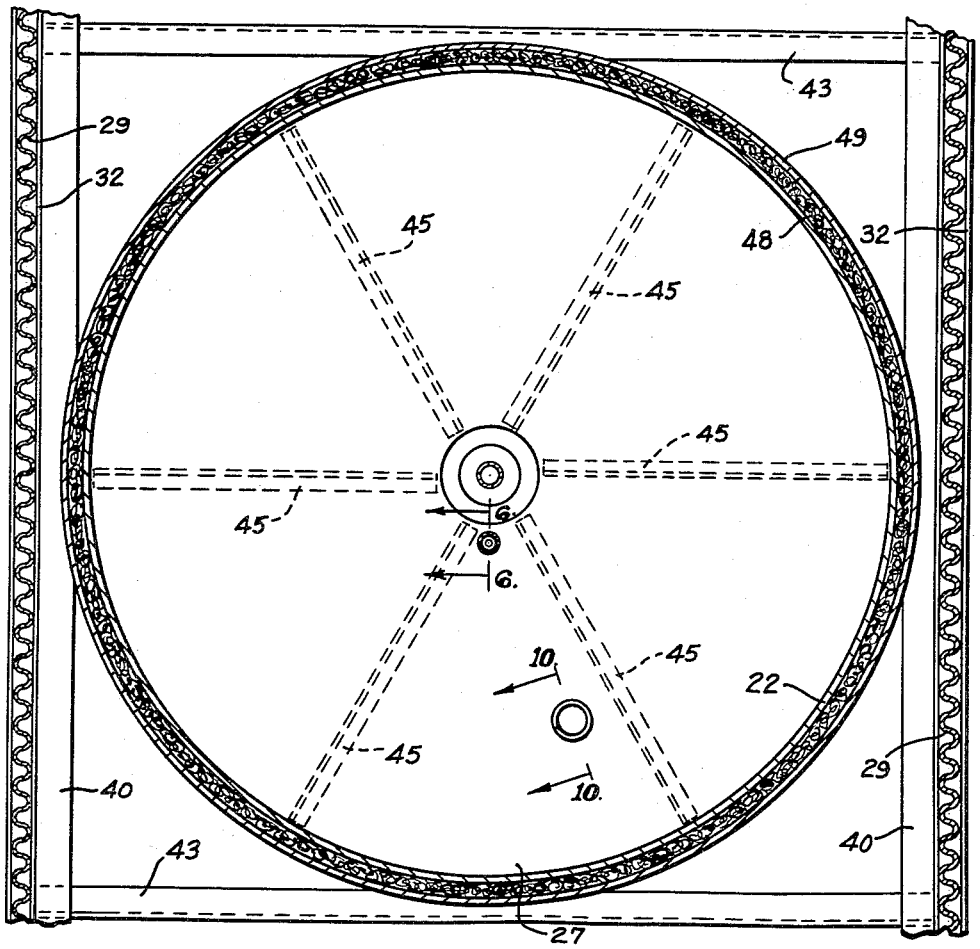
FIG. 5 is a horizontal sectional view thereof taken on the line 5—5 of FIG. 4.
Figure 9:
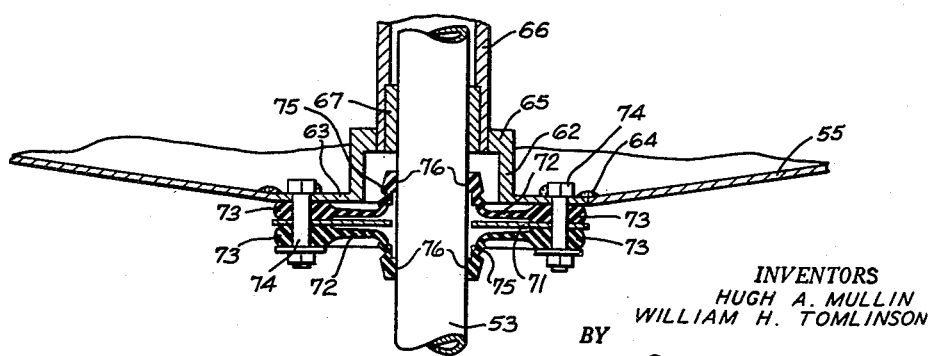
FIG. 9 is an enlarged fragmentary vertical sectional view taken on the line 9—9 of FIG. 4.
Figure 10:
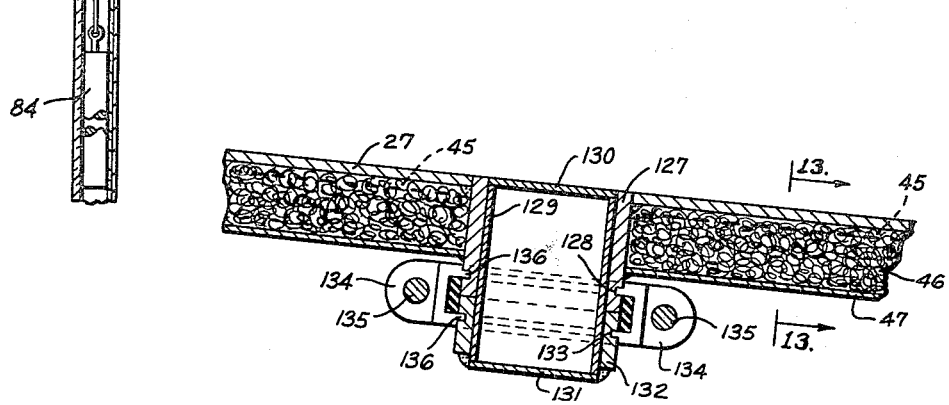
FIG. 10 is a fragmentary detail sectional view, on an enlarged scale, taken on the line 10—10 of FIG. 5.

The bottom of the tank 27 is provided with reinforcing members, such as the angles 45, secured to the under face thereof, arranged as shown in FIG. 5, said angles also being shown in FIGS. 6 and 10 and in FIG. 13. The bottom of the tank is provided with a covering of heat insulating material 46, which is preferably cemented to the tank wall, and a cover member 47 of sheet metal is preferably provided on the exterior of the heat insulating material to protect the same. The side wall of the tank 22 is also provided with heat insulating covering material 48 mounted in the same manner as the covering material 46 and enclosed by means of suitable covering material 49, which may be wire mesh or sheet metal, as may be found desirable.

Referring to FIGS. 2 and 4, extending across the top of the tank and mounted on the angle members 23 at the ends thereof is a pair of frame members 50, which incline upwardly from the ends thereof mounted on the angle members 23 to a horizontal central portion 51. A cross pin 52 is mounted in said members 50 for swingingly mounting the upper end of a tubular member 53, which serves as a guide member in a manner to be described below. Said tubular member 53 is mounted to pivot about the axis of the pin 52 and is loosely enough mounted thereon that it can have some movement in all directions transversely of the length of said member 53. The lower end of the tubular member 53 is provided with a tapered closure as shown at 54, and extends into the sump 28 in widely spaced relation to the peripheral wall thereof.

Mounted in each of the tanks 22 is a follower, which has a conical bottom wall 55 sloping downwardly toward the middle of the follower and being of the same pitch as the bottom wall 27 of the tank. A channel ring 56 is welded to the circumferential outer edge portion of the bottom wall 55 of the follower and a ring 57 angular in cross section is welded to the channel ring 56 to thus provide a rigid ring-like structure at the periphery of the follower, which will maintain the truly circular peripheral shape thereof so that it will properly fit within the circular side wall of the tank 22 in close adjacency thereto. A sealing ring 58 of rubber or similar material is secured to the channel ring 56 by means of a clamping ring 59 and bolts 60 (see FIG. 8), said sealing ring 58 having a substantially circular in cross section tubular peripheral portion 61 that engages the side wall of the tank 22 and seals the joint between said side wall of the tank 22 and the follower, and also serves as a wiper member for removing any grease that may adhere to the tank wall as the follower moves up and down in the tank, the important thing being that it wipes the side wall of the tank substantially clean during its descending movement so that no grease that was contained in the tank is clinging to the side walls after the tank has been emptied.

Figure 8:
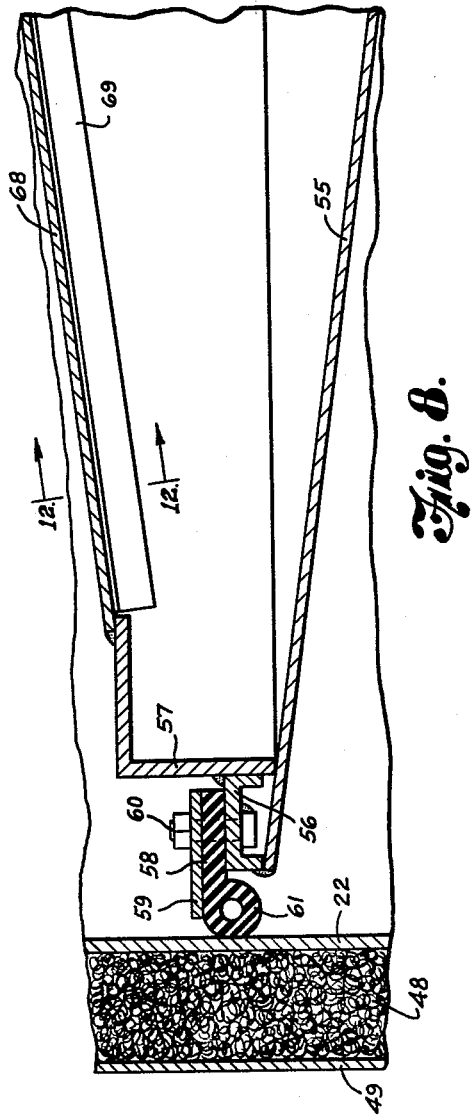
FIG. 8 is a fragmentary detail sectional view taken on the line 8—8 of FIG. 7, on an enlarged scale.

At the center thereof the bottom wall 55 of the follower has a collar 62 provided thereon, which has a peripheral flange 63 that is welded to the bottom wall 55 at 64, and an inwardly directed flange 65 in which a sleeve 66 is mounted in fixed position, a bushing 67 mounted in the sleeve 66 slidably receiving the tubular guide member 53. Mounted on the angle ring 57 is the top conical wall 68 of the follower, the peripheral edge portion of the top wall 68 being welded to the horizontal leg of the angle ring 57 as shown in FIG. 8. Said top wall is provided with reinforcing elements 69, being made of light gauge sheet metal as compared with the bottom wall 55. At the center of the top wall 68 the sleeve 66 projects through a central opening therein and a bushing 70, similar to the bushing 67, slidably receives the tubular guide member 53 at the upper end of said sleeve 66.

Mounted on the bottom wall 55 is a sealing and wiping means comprising the metal ring 71 and a pair of flexible members 72, which are made of rubber or similar material, and have outer peripheral thickened portions 73 that are bolted to the flange 63 on the collar 62 by means of the bolts 74. Said flexible members have oppositely directed inner flanges 75 thereon, that terminate in inwardly directed ends 76 that are in wiping and sealing engagement with the tubular guide member 53.

The follower will move upwardly, as the grease that is being fed into the tank through the sump 28 rises in the tank due to the pressure exerted on the bottom wall 55 of the follower thereby, and such upward movement will continue until the filling operation has been completed. When grease is withdrawn from the tank the follower will move downwardly through the position shown in FIG. 4 to the position shown in FIG. 11 with the wall 55 in substantially face to face engagement with the bottom wall 27, the sump 28 being of such diameter at the upper end thereof that the sealing members 72 can be accommodated by the sump with some clearance left between said sealing members and the conical wall of the sump 28.

Gauging means provided with a suitable indicator is provided for the tank, which is provided with a ring-like member 77 that is mounted on the upper end of the sleeve 70 by means of a plurality of brackets 78, only one of which is shown in FIG. 4, the gauging means being omitted in FIG. 4. A flexible member 79 is connected with the ring 77, which is spaced from the sleeve 70 by means of the brackets 78, with a snap hook 80. Said flexible member operates over the pulley 81 mounted on the central portion 51 of one of the transverse frame members and over a pulley 82 that is mounted on an angle bracket 83 on the frame member 24. A counterweight 84 is provided on the opposite end of the flexible member 79 from the snap hook 80, which slides up and down in one of the corrugations of the housing side wall 29, said corrugation being provided with a ply of transparent covering material 191 provided with suitable indicia for indicating, by the position of the counterweight 84, the quantity of grease in the tank.

Also mounted on one of the frame members at the central portion 51 thereof is a bracket 85, which has a switch 86 mounted thereon, which is provided with an operating member 87. A flat guide bar 88 projects from the bracket 85 and has a stop member 89 mounted thereon. The guide bar 88 extends below the bottom edge of the bracket 85 and has a tubular guide member 90 provided thereon that longitudinally slidably receives a pin 91 therein, which is connected with an angle member 92 that has the foot portion 93 thereon, which is adapted to engage with the upper end of the tubular member 90. A weight 137 is secured to the one marginal edge of the angle member 92 and serves to return the part to the position shown in FIG. 17 when the top 68 of the follower is disengaged therefrom. Upon upward movement of the follower 68 beyond the position shown in FIG. 17 the switch 87 will be closed by engagement of the upper end of the angle member 92 therewith and a suitable alarm connected with said switch will be sounded. Upward movement of the parts is limited by engagement of the foot portion 93 with the stop member 89. The position of the stop member 89 is such that the tank 22 would be overfilled before the position of the switch operating member 92 is reached in which the foot portion 93 engages the stop 89.

The sump 28 is provided with a flange 94, which is bolted to a flange 95 on a pump body 96, suitable gasket means being provided between the flanges 94 and 95 to assure a fluid tight connection. The sump 28' on the rear tank 22 is provided with an angular portion 97, which is tapered at 98 and which is provided with a flange 94 for securing to the flange 95 on the pump body 96. The pump body 96 is mounted on a transverse channel member 99, which, in the case of the two forward tanks 22, is mounted between brackets 100, which depend from the angle members 40 and are secured thereto. The frame member 99 on which the pump body 96 for the rearmost tank 22 is mounted, extends between a pair of longitudinally extending plates 101 provided on the vehicle frame, and is secured thereto.

Connected with flanges 102 on each of the two forward pump bodies is a flange 103 on an elbow 104, said flanges being bolted to each other, and suitable sealing means being provided between the same, while the flange 102 on the rearmost pump body 96 has a straight fitting 104' provided thereon, which has its flange 103 connected with the flange 102 in a similar manner to the connection between the elbow 104 and the pump body. Connected with each of the members 104 or 104' is a valve 105, which is provided with suitable manual operating means 106 for the same. A T 107 connects the valve 105 with a pipe 108 and with a short nipple 109. The nipple 109 is provided with a removable cap 110 on the one end thereof, said cap being adapted to be removed and a quick coupling 111 substituted therefor. Mounted on the quick coupling 111 is an adapter 112, to which is connected a compressed air supply pipe 113 controlled by a valve 114 (see FIG. 16). The nipple 109 is provided with a bleed valve 115, which may be actuated during a tank filling operation to bleed the air from the pipe connections and the hose 116, which is shown as being connected with the threaded end 117 of the pipe 108 by means of a quick coupling 118 in FIG. 16. The other end of the hose 116 is shown in FIG. 16 as being provided with a quick coupling 119, to which a fitting 120 is connected, which is open at the threaded end 121 thereof and which has a cross pin 122 therein. The purpose of providing the adapter 112, the compressed air connection 113 and the fitting 120 is that when it is desired to clean out the nipple 109, the T 107, the pipe 108 and the hose 116 a suitable clean-out plug of suitable material for cleaning out pipes and tubes is inserted in the open end of the nipple 109 before the quick coupling 111 is applied thereto and forced through the nipple 109, the T 107, the pipe 108 and the hose 116 and is halted in its movement by the cross pin 122.

Also mounted on each of the frame members 99 is a fluid motor 123, which is provided with a shaft 124 that is connected by means of a coupling 125 with the shaft 126 of the pump having the body 96. The pump that is mounted in the pump body 96 is a gear pump, which is adapted to be driven in a direction to pump grease into the tank 22 with which it is associated, but which is also adapted to rotate in the reverse direction during the grease discharging operation, as will be explained below.

The tank bottom 27 is provided with an opening therein that has a tubular member 127 mounted therein and welded in position in liquid tight relation to the bottom wall 27. Said tubular member is provided with a peripheral groove 128 near the outer end thereof. A tubular member 129 is slidably mounted in the tubular member 127 and is provided with closed end walls 130 and 131. A sleeve 132 of the same diameter as the member 127 and provided with a peripheral groove 133 adjacent its inner end is welded to and surrounds the tubular member 129. A suitable clamping device 134 made up of a pair of members secured in clamping relation with the members 127 and 132 by the securing elements 135 is provided with inwardly directed ribs 136 seating in the grooves 128 and 133. Thus, if it is necessary to clean out the tank, the plug 130 can be removed after removal of the clamping means, but the plug will be firmly held in position by the clamping means when pressure is exerted on the same during the filling operation of the tank.

Figure 14:
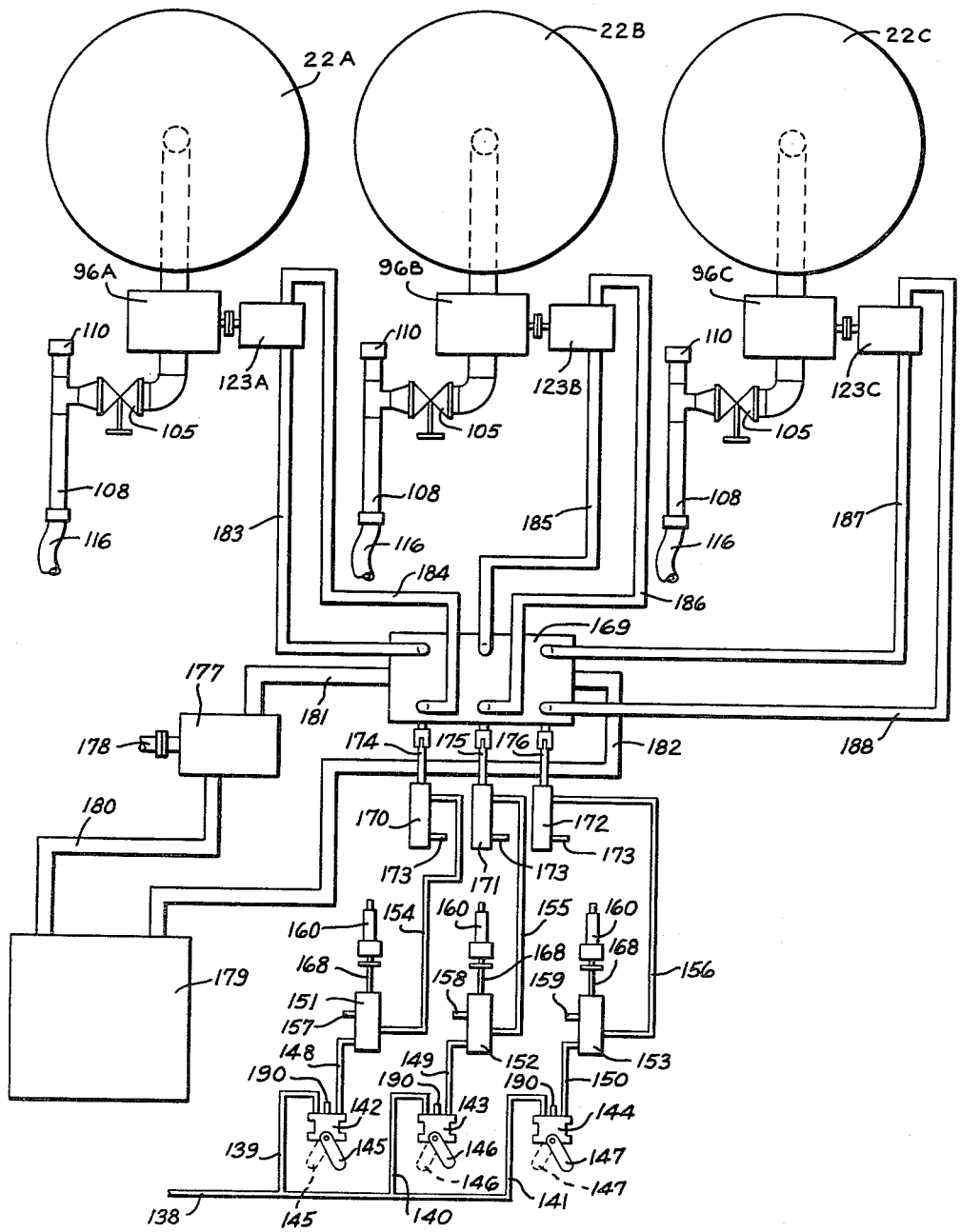
FIG. 14 is a diagrammatic view showing the piping arrangement for selective operation of the pumps associated with the various tanks.

Referring to FIG. 14, in which the selecting means for operating a selected pump of a selected tank for withdrawing the contents of said tank, is shown diagrammatically, a supply line 138 for air under pressure is shown as being provided with a plurality of branches 139, 140 and 141, which lead to the manually operated valves 142, 143 and 144 provided with operating handles or levers 145, 146 and 147. From the valves 142, 143 and 144 extend the conduits 148, 149 and 150, respectively, to intercepter bleed valves 151, 152 and 153, respectively. Said valves have a position in which the same connect the conduit 148 with the conduit 154, the conduit 149 with the conduit 155, and the conduit 150 with the conduit 156, and a position in which the conduit 154 is connected with a conduit 157 that is open to the atmosphere, the conduit 155 is connected with a conduit 158 open to the atmosphere, and the conduit 156 is connected with a conduit 159 open to the atmosphere.

The valves 151, 152 and 153 are each provided with operating means, such as shown in FIG. 6, which comprises a plunger 160, which is slidably mounted in a pair of bushings 161 and 162 mounted in a tubular housing 163, which is secured in liquid tight relation to the bottom 27 of the tank, said operating members 160 and the mounting therefor being the same for all of the tanks 22. The tubular member 163 is closed by means of a packing gland 164, which is provided with suitable packing material 165. The plunger 160 is provided with a flange 166 thereon, which is urged by a compression spring 167 toward the tank bottom 27, said spring extending between the valve body, such as the valve 151, and said flange 166. Said valves are each provided with a push rod 168 engaged by the projecting end of the plunger 160 for moving said valve from the position in which it is connecting the conduits 148 and 154, 149 and 155, or 150 and 156, to a position in which the valve so actuated is open to the atmosphere so that the conduit with which it is connected, such as the conduits 154, 155 or 156, has the pressure therein reduced to atmospheric, the air under pressure supplied from the pipe 148, 149 or 150 being discharged into the atmosphere. Each of the pipes or conduits 154, 155 and 156 is connected with an actuator for the selecting means, which selecting means is indicated generally by the numeral 169, the actuator 170 being connected with the pipe or conduit 154, the actuator 171 with the pipe or conduit 155 and the actuator 172 with the pipe or conduit 156. Said actuators 170, 171 and 172 are air cylinders provided with pistons that move toward the exhaust pipe 173 provided on each of said actuators when air under pressure is supplied to the other end of the cylinder through one of the pipes 154, 155 and 156. This will exert a pulling action on the operating member associated with the actuator supplied with air under pressure, these operating members being indicated by the numerals 174, 175 and 176.

A pump 177 for hydraulic fluid is driven continuously by suitable driving means through the shaft 178 and the circulation of said hydraulic fluid is from the reservoir 179 through the intake pipe 180 to the pump 177 and from the pump 180 to the discharge pipe 181. The discharge pipe 181 leads into the selecting means 169 and a return pipe 182 extends from the selecting means 169 back to the reservoir 179. In order to distinguish between the tanks illustrated in FIG. 14, the various pumps associated with said tanks and the hydraulic motors driving said pumps, the respective tanks are designated 22A, 22B and 22C, the pumps 96A, 96B and 96C and the hydraulic motors 123A, 123B and 123C.

Extending from the selecting means 169 is a conduit 183, which supplies hydraulic fluid to the hydraulic motor 123A and a return conduit 184 extend from the hydraulic motor 123A. Similarly, a supply conduit 185 for the hydraulic fluid extends from the selecting means 169 to the hydraulic motor 123B and a return pipe 186 extends therefrom back to the selecting means 169 and a supply conduit 187 extends to the hydraulic motor 123C and a return conduit 188 extends therefrom back to the selecting means 169.

Figure 15:
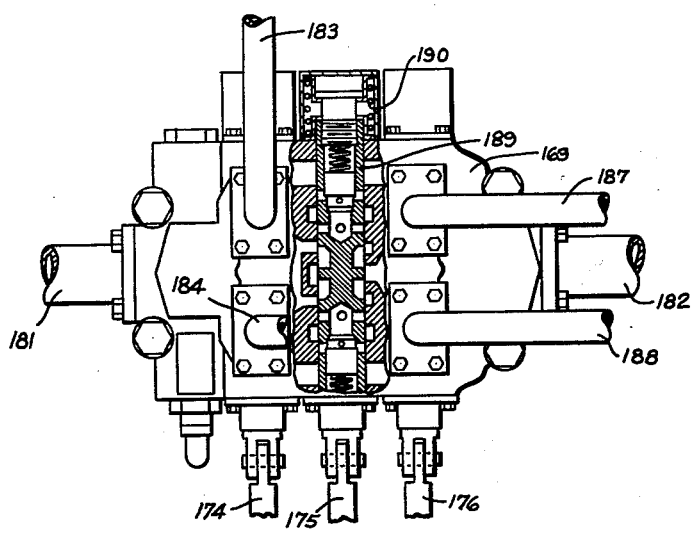
FIG. 15 is a view partly in elevation, partly in section and partly broken away, of the selector member of the pump selecting mechanism.

In FIG. 15 one of the movable valve members 189 in said selecting means 169 is shown, there being one of said valves 189 for each of the pairs of conduits 183 and 184, 185 and 186, and 187 and 188. In FIG. 15 the valve member 189 is shown in the position in which it is held by the spring 190, which is the position in which the conduit 185 is disconnected from the conduit 181. However, when the valve 189 is moved downwardly, as viewed in FIG. 15, by a pull thereon of the operating member 175 responsive to air under pressure being supplied to the actuator 171 through the supply conduit 155, the valve member 189 will connect the conduit 181 with the conduit 185 and the hydraulic motor 123B will drive the pump 96B. The driving of the pump 96B by the motor 123B will continue until the operation thereof is stopped by movement of the handle 146 of the valve 143 to an off position, or until the tank 22B is completely emptied, whereupon the bottom 55 of the follower will engage the plunger 160 and the plunger will operate the member 168 of the intercepter bleed valve 152 to vent the pipe 155 to the atmosphere, whereupon the valve 189 will be returned to the position shown in FIG. 15, disconnecting the conduit 181 from the conduit 185.

The valves are shown with their operating levers in their "on" position, in which air under pressure is supplied to the conduits 148, 149 and 150 and in dotted lines in their "off" position, in which no air under pressure will be supplied to these conduits and the same will be vented to the atmosphere through the vent connection 190 on each of said valves. When the valve 189 is in the position shown in FIG. 15 the conduit 185 is connected with conduit 186 through the valve 189, while when the valve 189 is in the alternate position the conduit 185 is connected with the conduit 181 and the conduit 186 with the conduit 182. Thus when the valve operating lever 146 is moved to the full line position the pump 96B will be operated through the operation of the hydraulic motor 123B, the flow of hydraulic fluid being from the pump 177 through conduit 181, valve 189, conduit 185 and back through the conduits 186 and 182 to the reservoir 179.

Similarly, the pump 96A will be driven by the hydraulic motor 123A when the valve operating member 145 is moved to full line position and the pump 96C will be operated through the hydraulic motor 123C when the valve operating member 147 is moved to the full line position, there being, of course, a valve 189 in the selector 169 for each of the pairs of conduits extending from the selector to the respective hydraulic motors, each controlled by its manually operated air valve.

When a tank is being filled by means of a pump, that is at the point of loading of the vehicle, through the hose 116 and conduit 108 associated with a particular tank, the flow will be through the valve 105 and the pump associated with that tank rotating the pump and the hydraulic motor in the opposite direction to which it is driven by supply of hydraulic fluid under pressure thereto. Thus, assuming that the tank 22B is being filled, the valve 189 will be in the position shown in FIG. 15 and the conduit 185 will be connected with the conduit 186. This will permit the hydraulic motor to circulate the fluid by its being driven by the pump 96B through the conduits 185 and 186 and the selector member 169 by the pressure exerted on the pump gears by the grease being pumped through the same into the tank 22B.

What we claim is:

1. In a tank vehicle, an open topped tank having an upstanding cylindrical side wall, a bottom wall having a central inlet and outlet opening therein, a circular follower mounted in said tank for up and down movement therein, said follower having its periphery closely adjacent said side wall, a guide member extending axially of said tank, means at the top of said tank for swingingly mounting said guide member, the bottom end of said guide member extending downwardly below the bottom wall of said tank and into said central opening and being free of said tank, a cooperating guide member on said follower receiving said axially extending guide member, annular wiping means mounted on said follower and engaging said side wall and wiping means on said follower engaging said guide member.

2. In a tank vehicle, an open topped tank having an upstanding cylindrical side wall, a bottom wall, a circular follower having a bottom wall extending parallel to the bottom wall of said tank, said follower being mounted in said tank for up and down movement therein, between an elevated postion and a position in face to face engagement with said bottom wall, said follower having its periphery closely adjacent said side wall, said bottom wall of said tank having a central opening, and a sump extending downwardly from said bottom wall and leading from said central opening.

3. In a tank vehicle, a plurality of open topped grease tanks mounted in adjacency lengthwise of said vehicle, a follower mounted in each of said tanks for up and down movement therein, an outlet connection leading from the bottom of each of said tanks, a gear pump connected with each of said outlet connections and means for selectively operating any one of said pumps to withdraw grease from a selected tank, said operating means providing for reverse operation of said pumps to permit flow of grease through a selected pump to the tank having the outlet connection with which said pump is connected.

4. In a tank vehicle a tank having an open top, upstanding side wall and bottom wall having a conduit leading therefrom, a pipe open at both ends extending transversely of said conduit and connected therewith between the ends thereof, a valve in said conduit between said pipe and tank, a removable closure member for one of the open ends of said pipe, a bleed valve connection on said pipe adjacent said last mentioned open end thereof, and means for connecting a filling hose at the other end thereof, said conduit being connected with said pipe adjacent said last mentioned end thereof but spaced inwardly from said end beyond said bleed valve connection.

5. In a tank vehicle, an open topped tank having upstanding side wall, a conical bottom wall sloping downwardly toward the center thereof, a follower mounted for up and down movement in said tank between an elevated position and a position in face to face engagement with said bottom wall, said follower having a conical bottom wall conforming to the bottom wall of said tank, and wiping means mounted at the periphery of said follower and engaging said tank wall, and an outlet connection leading from the center of said tank bottom wall and extending downwardly therefrom.

6. In a tank vehicle, an open topped tank having an upstanding side wall, a follower mounted for up and down movement in said tank, said follower having oppositely projecting conical bottom and top walls, a sleeve co-axial with said walls extending between the same and secured thereto at opposite ends thereof, a swingably mounted central guide member extending through said sleeve, bushings mounted in opposite ends of said sleeve slidably receiving said guide member, vertically spaced wiping means mounted on said bottom wall below said sleeve and engaging said guide member, and wiping means mounted at the periphery of said follower and engaging said tank wall.

7. In a tank vehicle, an open topped tank having an upstanding cylindrical side wall, a circular follower mounted in said tank for up and down movement therein, said follower having its periphery closely adjacent said side wall, a structural member extending transversely across the open top of said tank, a guide member extending centrally lengthwise of said tank suspended swingingly from said structural member for limited lateral movement, a cooperating guide member on said follower receiving said centrally extending guide member, annular wiping means mounted on said follower and engaging said side wall and wiping means on said follower engaging said guide member.

8. In a tank vehicle, an open topped tank having an upstanding side wall, a follower mounted for up and down movement in said tank, an alarm, and means for operating said alarm by upward movement of said follower through a zone adjacent but below the upper limit of movement of said follower, comprising a normally open switch controlling operation of said alarm and means for moving said switch to circuit closing position comprising a member mounted for guided vertical movement above said follower in a position to be engaged by said follower upon predetermined upward movement of said follower, means limiting said downward movement of said member and means urging said member downwardly.

9. In a tank vehicle of plurality of open topped grease tanks mounted in adjacency lengthwise of said vehicle, a follower mounted in each of said tanks for up and down movement therein, an outlet connection leading from the bottom of each of said tanks, a pump connected with each of said outlet connections, means for selectively operating any one of said pumps to withdraw grease from a selected tank and means for halting the operation of the selected pump comprising a controlling member in the bottom of the tank connected with said pump engaged by the follower in said tank upon reaching said bottom.

10. In a tank vehicle a tank having an open top, upstanding side wall and bottom wall having a conduit leading therefrom, a pipe of uniform bore open at both ends extending transversely of said conduit and connected therewith between the ends of said pipe, a valve in said conduit, and a valved compressed air connection leading into said pipe at one open end thereof.

11. In a tank vehicle, an open topped tank having an upstanding side wall, a framework on said vehicle having longitudinal members, cross members extending between said longitudinal members and obliquely extending bracing members each extending between one of said longitudinal and one of said cross members, said members being secured together to form on octagonal support, an annular peripheral outwardly directed flange around the of said tank seated upon the support formed by said longitudinal, cross and obliquely extending members, at spaced points along said flange, supporting members mounted on said vehicle adjacent the bottom of said tank and an angle ring secured to and extending around the bottom of the side wall of said tank seated on said supporting members.

12. In a tank vehicle, a plurality of open topped grease tanks mounted in adjacency lengthwise of said vehicle, a follower mounted in each of said tanks for up and down movement therein, an outlet connection leading from the bottom of each of said tanks, a gear pump connected with each of said outlet connections and means for selectively operating any one of said pumps to withdraw grease from a selected tank, comprising a fluid motor for driving each of said pumps, a valve controlling the supply of operating fluid to said pump, said valve having a position to supply said operating fluid to said motor to drive said pump in one direction to discharge grease from said tank and a position in which said operating fluid is circulated in a closed circuit by rotation of said pump in the opposite direction upon flow of grease therethrough into said tank.

13. In a tank vehicle, an open topped tank having an upstanding cylindrical side wall, a bottom wall, a circular follower having a bottom wall extending parallel to the bottom wall of said tank, said follower being mounted in said tank for up and down movement therein between an elevated position and a position in face to face engagement with said bottom wall, said follower having its periphery closely adjacent said side wall, said bottom wall of said tank having a cleanout opening therein, an outer tubular member mounted in said opening extending downwardly from said bottom wall, an inner tubular member having a closed end wall, said inner tubular member being slidably mounted in said outer tubular member, and clamping means engaging said tubular members to detachably hold said inner tubular member in fixed position in said outer tubular member with said end wall flush with the bottom wall of said tank.

14. In a tank vehicle, an open topped tank having a cylindrical upstanding side wall, upper, lower and intermediate stiffening rings mounted on said side wall, a follower having its periphery closely adjacent said side wall mounted for up and down movement in said tank, said tank having a downwardly projecting conical bottom wall, said follower having a downwardly projecting conical bottom wall conforming to the bottom wall of said tank, a peripheral reinforcing and stiffening ring secured to said bottom wall of said follower, an upwardly projecting conical top wall for said follower, a supporting ring for said top wall secured to said reinforcing and stiffening ring, a central sleeve extending between and secured to said top and bottom walls of said follower at opposite ends of said sleeve and radial stiffening members for said top and bottom walls extending between said supporting ring and sleeve, said stiffening ring of said follower having a flat top face, a sealing ring mounted thereon and a clamping ring cooperating with said flat top face to secure said sealing ring in position on said follower, said sealing ring having an outwardly projecting annular portion in wiping engagement with said upstanding side wall.

References Cited by the Examiner
UNITED STATES PATENTS

| | | | |
|---|---|---|---|
| 53,794 | 4/66 | Densmore | 105—360 |
| 58,838 | 10/66 | Kraut | 222—45 X |
| 283,137 | 8/83 | Nevius | 222—45 X |
| 523,951 | 7/94 | Van Fleet | 222—39 |
| 1,232,510 | 7/17 | Derrick et al. | 222—193 |
| 1,678,763 | 7/28 | Bolger | 211—71 |
| 1,705,649 | 3/29 | Scott | 222—146 X |
| 1,783,106 | 11/30 | Biron | 222—39 X |
| 1,885,081 | 10/32 | Clapp | 22—39 |
| 1,892,519 | 12/32 | Schottgen | 222—176 X |
| 2,063,727 | 12/39 | Davis | 222—176 |
| 2,192,862 | 3/40 | Eagley | 222—176 X |
| 2,232,422 | 2/41 | Atwood | 222—176 |
| 2,281,651 | 5/42 | Wolcott | 222—173 X |
| 2,285,543 | 6/42 | Thomas | 280—5 |
| 2,321,395 | 6/43 | Kirk | 222—176 X |
| 2,358,190 | 9/44 | Theriault | 280—5 |
| 2,767,890 | 10/56 | Carter | 222—386 |
| 2,811,284 | 10/57 | Rogers | 222—173 |
| 2,936,933 | 5/60 | Malec | 222—386 |
| 2,984,392 | 5/61 | Wadenby | 222—176 X |
| 3,058,753 | 10/62 | Carlsen | 280—5 |
| 3,095,206 | 6/63 | Fresia et al. | 222—176 X |

FOREIGN PATENTS

| | | |
|---|---|---|
| 1,100,852 | 4/55 | France. |
| 1,167,358 | 7/58 | France. |

RAPHAEL M. LUPO, *Primary Examiner.*
LOUIS J. DEMBO, *Examiner.*